United States Patent
Glew et al.

(10) Patent No.: US 10,329,367 B2
(45) Date of Patent: Jun. 25, 2019

(54) POLYMERIC YARNS FOR USE IN COMMUNICATIONS CABLES AND METHODS FOR PRODUCING THE SAME

(71) Applicant: Cable Components Group, LLC, Pawcatuck, CT (US)

(72) Inventors: Charles A. Glew, Charlestown, RI (US); David M. Braun, North Attleborough, MA (US)

(73) Assignee: Cable Components Group, LLC, Pawcatuck, CT (US)

(*) Notice: Subject to any disclaimer, the term of this patent is extended or adjusted under 35 U.S.C. 154(b) by 0 days.

(21) Appl. No.: 15/163,780

(22) Filed: May 25, 2016

(65) Prior Publication Data

US 2016/0264700 A1   Sep. 15, 2016

Related U.S. Application Data

(63) Continuation of application No. 14/157,227, filed on Jan. 16, 2014, now Pat. No. 9,354,413.

(60) Provisional application No. 61/754,440, filed on Jan. 18, 2013.

(51) Int. Cl.
| | |
|---|---|
| G02B 6/44 | (2006.01) |
| C08F 214/26 | (2006.01) |
| C08F 114/20 | (2006.01) |
| C08F 114/22 | (2006.01) |
| C08F 210/16 | (2006.01) |
| C08F 214/24 | (2006.01) |
| H01B 11/00 | (2006.01) |

(52) U.S. Cl.
CPC ........ *C08F 214/265* (2013.01); *C08F 114/20* (2013.01); *C08F 114/22* (2013.01); *C08F 210/16* (2013.01); *C08F 214/245* (2013.01); *C08F 214/262* (2013.01); *G02B 6/44* (2013.01); *G02B 6/449* (2013.01); *H01B 11/002* (2013.01); *G02B 6/4486* (2013.01)

(58) Field of Classification Search
CPC .... G02B 6/443; G02B 6/4401; G02B 6/4486; G02B 6/449; G02B 6/486; G02B 6/4484; H01B 11/1855; H01B 11/0876; H01B 11/1865
USPC .................................. 385/100–113
See application file for complete search history.

(56) References Cited

U.S. PATENT DOCUMENTS

| | | | | |
|---|---|---|---|---|
| 5,633,075 | A | * | 5/1997 | Park ...................... B29B 15/105 428/372 |
| 5,913,003 | A | | 6/1999 | Arroyo et al. |
| 6,045,680 | A | * | 4/2000 | Cawston ............. C23C 18/1644 205/138 |
| 2004/0058152 | A1 | * | 3/2004 | Tokarsky ................. D01D 4/00 428/373 |
| 2004/0237494 | A1 | * | 12/2004 | Karayianni ............ D02G 3/328 57/212 |
| 2006/0231286 | A1 | * | 10/2006 | Varkey ................. H01B 7/1895 174/113 R |

(Continued)

*Primary Examiner* — Kaveh C Kianni
*Assistant Examiner* — Hung Q Lam
(74) *Attorney, Agent, or Firm* — Nelson Mullins Riley & Scarborough LLP; Reza M. Mollaaghababa; Thomas J. Engellenner

(57) ABSTRACT

In some aspects, polymeric yarns and communications cables incorporating the same are provided herein. Additionally, in some aspects, methods of producing polymeric yarns and communications cables incorporating the same are provided.

20 Claims, 5 Drawing Sheets

(56) References Cited

U.S. PATENT DOCUMENTS

| | | | |
|---|---|---|---|
| 2008/0118209 A1* | 5/2008 | Varkey | G02B 6/4486 |
| | | | 385/101 |
| 2011/0284287 A1 | 11/2011 | Glew | |
| 2012/0063730 A1* | 3/2012 | Gagnon | G02B 6/4436 |
| | | | 385/100 |
| 2013/0142491 A1 | 6/2013 | Ruzzier et al. | |
| 2013/0248240 A1 | 9/2013 | Glew | |
| 2014/0170416 A1* | 6/2014 | Han | D06M 15/263 |
| | | | 428/395 |
| 2015/0233026 A1* | 8/2015 | Abdulbaki | D02G 3/045 |
| | | | 428/96 |

\* cited by examiner

POLYMERIC YARNS FOR USE IN COMMUNICATIONS CABLES AND METHODS FOR PRODUCING THE SAME

RELATED APPLICATION

The present application is a continuation of U.S. application Ser. No. 14/157,227, filed Jan. 16, 2014, which claims priority to a provisional patent application No. 61/754,440 filed on Jan. 18, 2013 entitled "Polymeric yarns for use in communications cables and methods for producing the same." The teachings of all above-listed applications are herein incorporated by reference in their entirety.

FIELD

The invention generally relates to communications cables, and more particularly, to polymeric yarns for use in communications cables and components thereof, and methods for producing the same.

INTRODUCTION

A broad range of electrical conductors and electrical cables are installed in modern buildings for a wide variety of uses. Such uses include, among others, data transmission between computers, voice communications, video communications, power transmission over communications cables, e.g., power over Ethernet, as well as control signal transmission for building security, fire alarm, and temperature control systems. These cable networks extend throughout modern office and industrial buildings, and frequently extend through the space between the dropped ceiling and the floor above. Ventilation system components are also frequently extended through this space for directing heated and chilled air to the space below the ceiling and also to direct return air exchange. The horizontal space between the dropped ceiling and the floor above is commonly referred to as the "plenum" area. Similarly, the vertical space of the walls between the floor and the ceiling include the networking of the aforementioned cable types. These vertical spaces are generally called the "riser" cabling space. Electrical conductors and cables extending through plenum areas are governed by special provisions of the National Electric Code ("NEC"). Cables intended for installation in the air handling space (i.e., plenums, risers, ducts, etc.) of buildings are specifically required by NEC/CEC/IEC to pass flame test specified by Underwriters Laboratories Inc. (UL), UL-910, or its Canadian Standards Association (CSA) equivalent, the FT-6. The UL-910, FT-6 and the NFPA 262, which represent the top of the fire rating hierarchy established by the NEC and CEC respectively. Also applicable are the UL 1666 Riser test and the IEC 60332-3C and D flammability criteria. Cables possessing these ratings, generally known as "plenum" or "plenum rated" or "riser" or "riser rated", may be substituted for cables having a lower rating (i.e. CMR, CM, CMX, FT4, FTI or their equivalents), while lower rated cables may not be used where plenum or riser rated cables are required.

Many communication systems utilize high performance cables. These high performance cables normally have four or more twisted pairs of conductors for transmitting data and receiving data. A transmitting twisted pair and a receiving twisted pair often form a subgroup in a cable having four twisted pairs. Other high performance cables can include coaxial cables, e.g., used singly or in conjunction with twisted pairs as a composite cable.

In a conventional cable, each twisted pair of conductors has a specified distance between twists along the longitudinal direction. That distance is referred to as the pair lay. When adjacent twisted pairs have the same pair lay and/or twist direction, they tend to lie within a cable more closely spaced than when they have different pair lays and/or twist directions. Such close spacing increases the amount of undesirable energy transferred between conductors, which is commonly referred to as cross-talk. Undesirable energy may also be transferred between adjacent cables (which is known as alien crosstalk) or alien near-end cross talk (anext) or alien far-end cross talk (afext).

The Telecommunications Industry Association and Electronics Industry Association (TIA/EIA) have defined standards for crosstalk, including TIA/EIA-568 A, B, and C including the most recent edition of the specification. The International Electrotechnical Commission (IEC) has also defined standards for data communication cable cross-talk, including ISO/IEC 11801. One high-performance standard for 100 MHz cable is ISO/IEC 11801, Category 5, or more recently referred to as Category 5e. Additionally, more stringent standards have been implemented for higher frequency cables including Category 6, augmented Category 6 (Category $6_A$), Category 7, augmented Category 7 (Category 7A), which are rated for frequencies in the range of 1 MHz through 1 GHz.

There remains a need for communications cables that can operate reliably while minimizing or eliminating cross-talk between conductors within a cable or alien cross-talk between cables, and also a need for separators for use in such telecommunications cables. There also remains a need for communications cables that can provide low smoke generation and overall flame retardancy, as required by the "NEC" for use in plenum and riser areas of a building.

SUMMARY

In accordance with certain embodiments of the applicants' teachings, a composition for use in a telecommunications cable is disclosed that includes a fibrillated polymeric yarn. In various embodiments, the fibrillated polymeric yarn can exhibit a linear mass density in a range of about 1750 to 22,000 denier, or multiples thereof. In some aspects, the fibrillated polymeric yarn can comprise a plurality of filaments. The filaments can have different cross-sectional areas or can have a substantially uniform cross-sectional area. The filaments comprising the fibrillated yarn can have a variety of sizes. By way of example, the filaments can exhibit an average linear mass density of about 8 to about 100 denier.

In accordance with some aspects, the polymeric yarn can be formed from a variety of materials. By way of example, the polymeric yarn can comprise a polyolefin. In some embodiments, the polymeric yarn can comprise a fluoropolymer such as any of PVDF, PVF, ECTFE, and ETFE, for example. In some aspects, the fluoropolymer can be a perfluoropolymer. In some aspects, suitable perfluorpolymer can have a processing temperature greater than about 600° F. In some aspects, the perfluoropolymer can be any of FEP, MFA, and PFA.

In accordance with certain embodiments of the applicants' teachings, a composition for use in a telecommunications cable is disclosed that comprises a fibrillated fluoropolymer yarn. In accordance with some aspects, the fluoropolymer yarn can be formed from any of PVDF, PVF, ECTFE, and ETFE, for example. In some aspects, the fluoropolymer can be a perfluoropolymer such as any of FEP, MFA, PFA, PTFE, and oriented PTFE, all by way of non-limiting example.

In accordance with certain embodiments of the applicants' teachings, a separator for use in a telecommunications cable is disclosed. The separator can include a bundle of polymeric yarn configured to extend longitudinally along a central axis of a cable containing at least two twisted pairs such that the bundle of polymeric yarn is effective to separate the at least two twisted pairs from one another.

In some aspects, the bundle of polymeric yarn can be conformable to a surface of the twisted pair. For example, the twisted pair can be sheathed and the bundle of polymeric yarn can be conformable to the sheath of the twisted pair.

The bundle of polymeric yarn can have a variety of sizes and configurations. By way of non-limiting example, the polymeric yarn can exhibit a linear mass density of about 1750 to 22,000 denier, or multiples thereof. In various aspects, the bundle of polymeric yarn can comprise a plurality of polymeric yarns. For example, the bundle of polymeric yarn can comprise a plurality of fibrillated polymeric yarns. In various aspects, the filaments can have different cross-sectional areas or can have a substantially uniform cross-sectional area. The filaments can also have a variety of sizes. By way of example, the filaments can exhibit an average linear mass density of about 8 to about 100 denier.

In accordance with some aspects, the polymeric yarn(s) of the separator can be formed from a variety of materials. By way of example, the polymeric yarn(s) can comprise a polyolefin. In some embodiments, the polymeric yarn(s) can comprise a fluoropolymer such as any of PVDF, PVF, ECTFE, and ETFE, for example. In some aspects, the fluoropolymer can be a perfluoropolymer. In some aspects, suitable perfluorpolymer can have a processing temperature greater than about 600° F. In some aspects, the perfluoropolymer can be any of FEP, MFA, PFA, PTFE, and oriented PTFE.

In accordance with certain embodiments of the applicants' teachings, a communications cable is disclosed that includes a plurality of twisted pairs of conductors extending along a length of the cable, and a bundle of polymeric yarn extending along a central axis of the cable and disposed between the twisted pairs, the bundle of polymeric yarn being configured to separate the at least two twisted pairs from one another. In various aspects, the bundle of polymeric yarn separating the at least two twisted pairs can have a variety of sizes and configurations and can be formed from a variety of materials, as otherwise discussed herein.

In some embodiments, the bundle of polymeric yarn is conformable to a surface of the twisted pair. By way of example, in some embodiments, the twisted pair is sheathed and the bundle of polymeric yarn is conformable to the sheath of the twisted pair.

In some embodiments, the bundle of polymeric yarns comprises a plurality of polymeric yarns. In some embodiments, the polymeric yarns exhibit a linear mass density of about 1750 to about 22,000 denier or multiples thereof.

In some embodiments, the bundle of polymeric yarns comprises a plurality of fibrillated polymeric yarns. The fibrillated polymeric yarns can comprise a plurality of filaments. In some embodiments, the filaments have a substantially uniform cross-sectional area. In some other embodiments, the filaments can have different cross-sectional areas. In some embodiments, the filaments can exhibit an average linear mass density of about 8 to about 100 denier.

In some embodiments, the polymeric yarns in the above communications cable comprises a polyolefin. In some embodiments, the polymeric yarns comprise a fluoropolymer. By way of example, the fluoropolymer can comprise any of PVDF, PVF, ECTFE, and ETFE. In some embodiments, the fluoropolymer comprises a perfluoropolymer, such as, FEP, MFA, PFA, PTFE, and oriented PTFE. By way of example, the perfluoropolymer can have a processing temperature greater than about 600° F.

In some aspects, a communications cable is provided that includes a plurality of twisted pairs of conductors extending along a length of the cable, and one or more polymeric yarns wrapped around at least one of the twisted pairs. The polymeric yarn(s) extend along a length of the twisted pair such that the twisted pairs are separated from one another by the polymeric yarns along at least a portion of the length. In various aspects, the bundle of polymeric yarns separating the at least two twisted pairs can have a variety of sizes and configurations and can be formed from a variety of materials, as otherwise discussed herein.

In some embodiments of such a communications cable, the polymeric yarn can exhibit a linear mass density of about 1750 to about 22,000 denier, or multiples thereof. In some embodiments, the polymeric yarns can include a plurality of fibrillated polymeric yarns. The fibrillated polymeric yarns can include a plurality of filaments. The filaments can have a substantially uniform cross-sectional area, or alternatively, they can have different cross-sectional areas. In some embodiments, the filaments can exhibit an average linear mass density of about 8 to about 100 denier. In some embodiments, the polymeric yarns can include a polyolefin. In some embodiments, the polymeric yarns can include a fluoropolymer, such as PVDF, PVF, ECTFE, and ETFE. In some embodiments, the fluoropolymer can be a perfluoropolymer, such as FEP, MFA, PFA, PTFE, and oriented PTFE. In some embodiments, the perfluoropolymer can have a processing temperature greater than about 600° F.

In some aspects, a communications cable is provided that includes a plurality of twisted pairs of conductors extending along a length of the cable, an outer jacket, and one or more polymeric yarns wrapped around the plurality of the twisted pairs, wherein the one or more polymeric yarns are disposed between the twisted pairs and the outer jacket. In various aspects, the one or more polymeric yarn(s) wrapped around the plurality of twisted pairs can have a variety of sizes and configurations and can be formed from a variety of materials, as otherwise discussed herein.

In various aspects, the cable can be a shielded or an unshielded cable. In some aspects, the polymeric yarn(s) can form a sheath around the plurality of the twisted pairs so as to separate the plurality of twisted pairs from the jacket substantially along its entire length. In some embodiments, a separator can be disposed between the twisted pairs along at least a portion of the length of the cable.

In some embodiments of the cable, the polymeric yarn can exhibit a linear mass density of about 1750 to 22,000 denier or multiples thereof. In some embodiments, the polymeric yarns can include a plurality of fibrillated polymeric yarns. The fibrillated polymeric yarns can include a plurality of filaments. In some embodiments, the polymeric yarn can include a polyolefin. In some embodiments, the polymeric yarns can include a fluoropolymer, such as PVDF, PVF, ECTFE, and ETFE. In some embodiments, the fluoropolymer can comprise a perfluoropolymer, such as FEP, MFA, PFA, PTFE, and oriented PTFE. In some embodiments, the perfluoropolymer can have a processing temperature greater than about 600° F.

In some aspects, a separator for use in a telecommunications cable is provided that comprises one or more polymeric yarns configured to extend longitudinally between at least a portion of conductors in a twisted pair.

These and other features of the applicants' teachings are set forth herein.

BRIEF DESCRIPTION OF THE DRAWINGS

The skilled person in the art will understand that the drawings, described below, are for illustration purposes only. The drawings are not intended to limit the scope of the applicants' teachings in any way.

DETAILED DESCRIPTION

Figure 1:
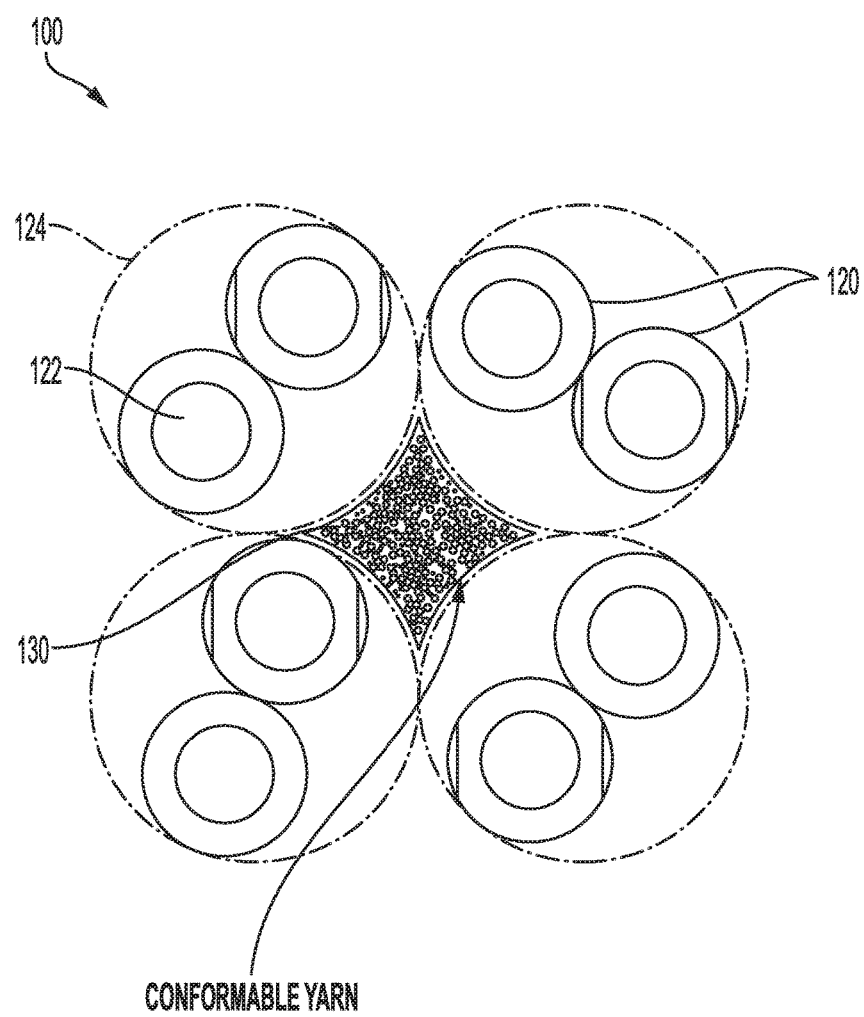
FIG. 1, in a schematic diagram, illustrates a cross-section of an exemplary cable utilizing a polymeric yarn to separate twisted pairs of conductors in accordance with an aspect of various embodiments of the applicants' teachings (dimensions are merely for illustration and should not be construed as limitations of the cable).

The following detailed description should be read with reference to the drawings. The drawings, which are not necessarily to scale, depict selected embodiments and are not intended to limit the scope of the invention. The detailed description illustrates by way of example, and is not intended to limit the scope of the invention. It will be apparent that the described embodiments may be susceptible to alteration or variation according to common general knowledge without departing from the scope of the disclosure. The following detailed description of embodiments is not to be regarded as limiting the scope of the applicants' teachings in any manner.

So that the invention may more readily be understood, certain terms are first defined.

As used herein, the terms "about" or "approximately" for any numerical values or ranges indicate a suitable dimensional tolerance that allows the composition, part, or collection of elements to function for its intended purpose as described herein. These terms indicate a variation of at most ±10% about a central value.

The term "fluoropolymer" is used herein consistent with its common usage in the art to refer a polymer having at least one monomer that includes at least one fluorine atom.

The term "perfluoropolymer" is used herein consistent with its common usage in the art to refer to a fluoropolymer in which all hydrogen atoms have been replaced with fluorine atoms.

The term "cross-talk" is used herein consistent with its common usage in the art to refer to electromagnetic interference between conductors, cables, or other electronic circuit elements.

The teachings herein generally provide polymeric yarns for use in communications cables and methods for producing the same. In accordance with various aspects of the present teachings, methods, devices, and compositions described herein can be utilized to reduce or eliminate cross-talk between conductors within a cable or alien cross-talk between cables. As discussed in more detail below, in some aspects of the present teachings, polymeric yarns formed from various polymeric materials can be used as separators and/or jackets in communications cable to provide structural support and/or separate various structures of the communications cable.

Polymeric yarns for use in the present invention can have a variety of configurations and can be fabricated using a variety of processes. Exemplary techniques include drawn staple fibers, which can be performed with or without air entanglement or air texturizing and with or without crimping. By way of example, a polymeric yarn can be a "fibrillated" polymeric yarn formed by fibrillating a precursor polymeric tape or film or by entangling a plurality of precursor polymeric filaments. With specific reference to an exemplary precursor polymeric tape or film, for example, the precursor tape or film can be fibrillated to a yarn configuration by mechanical fibrillation including twisting, rubbing, brushing, gas or solids impingement, etc. By way of non-limiting example, a precursor polymeric tape or film can be perforated lengthwise at regular intervals so as to create a lattice of connected filaments. Precursor polymeric filaments can also be fibrillated by a variety of techniques so as to form a fibrillated yarn in accordance with the present teachings. By way of example, several precursor polymeric filaments can be drawn from an extruded polymer and interlaced with one another through a process of air entanglement. In various aspects, a plurality of filaments can be introduced into a bore in which air vortices are generated by a jet of air directed into the bore at a direction perpendicular to the length of the bore, for example. The air vortices can cause the entanglement of the filaments as they pass through the bore. See, e.g., U.S. Pat. No. 3,983,609, which is herein incorporated by reference in its entirety. It will also be appreciated that the precursor polymeric tapes, films, and/or filaments, for example, utilized in accordance with the present teachings can be fabricated using a variety of methods. By way of example, pellets containing one or more polymers can be extruded so as to form the polymeric precursors.

Any suitable polymer modified in accordance with the present teachings can be used as the polymer base for forming the polymeric yarn. In some embodiments, melt-processable polymers such as polyolefins, fluoropolymers, or combinations thereof can be used. For example, a variety of fluoropolymers can be employed as the base polymer. In some embodiments, the base polymer can include one or more perfluoropolymers. By way of non-limiting example, in some embodiments, the base polymer can be any of MFA (polytetrafluoroethylene-perfluoromethylvinylether), FEP (fluorinated ethylene propylene), PFA (perfluoroalkoxy), PVF (polyvinyl fluoride), PTFE (polytetrafluoroethylene), oriented PTFE, ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof. In various embodiments, for example, the base polymer can be melted by exposure to an elevated temperature, e.g., a temperature of at least about 600° F., and then extruded into the polymeric precursor discussed above, for example.

Accordingly, the exemplary methods described above can be utilized to create various polymeric yarns in accordance with the present teachings. It will be appreciated, for example, that the teachings herein can be useful to fabricate a fluoropolymer or perfluoropolymer fibrillated yarn having a variety of configurations. By way of example, the techniques and the starting materials can be selected so as to fabricate a fibrillated yarn having a variety of densities and cross-sectional areas. By way of example, the fibrillated yarn can be configured to exhibit a variety of linear densities. In some embodiments, a fibrillated fluoropolymer or perfluoropolymer fibrillated yarn in accordance with the teaching herein can be fabricated to exhibit a linear mass density in a range of about 1750 to about 22,000 denier or multiples thereof, by way of non-limiting example. Additionally, the filaments that together make up the yarn can have the same or different cross-sectional areas. For example, though the individual filaments may exhibit an average linear mass density of about 8 to about 100 denier, the filaments can vary in cross-sectional diameter, for example, in a range from about 20 microns to about 100 microns.

Communications cables incorporating the various polymeric yarns described above can also have a variety of configurations. For example, with reference now to FIG. 1, one exemplary embodiment of a cable 100 incorporating a polymeric yarn in accordance with various aspects of applicants' teachings is illustrated schematically. As shown in FIG. 1, the cable 100 includes a plurality of twisted pairs 120 of conductors 122 (e.g., conductors adapted for transmitting digital data) arranged around the central axis of the cable 100 and surrounded by an outer jacket 125. Though each twisted pair 120 depicted in FIG. 1 is shown being contained within an insulating shield or sheath 124, it should be appreciated by a person skilled in the art that the twisted pairs can, in some embodiments, remain unshielded.

FIG. 1 additionally depicts a separator 130 disposed along the central axis of the cable 100 for separating the various twisted pairs 120 in accord with various aspects of the present teachings. Whereas prior art separators are generally pre-formed, monolithic structures containing grooves for maintaining the various twisted pairs spatially separated from one another, the exemplary separator 130 comprises a bundle of one or more polymeric yarns that can spatially separate at least two of twisted pairs 120 from another. In accordance with the present teachings, it will be appreciated that because of the structure of the one or more polymeric yarns, the orientation and/or lay of one or more of the filaments that make up the polymeric yarn or the bulk yarns themselves can be rearranged such that the separator 130 can conform to the outer surface of the sheath 124 (or the twisted pair 120 in cables in which the twisted pairs are unshielded). In such a manner, the conformable separator 130 can fill interstices between the sheaths 124 or the twisted pairs 120 in order to keep at least one of the twisted pairs 120 in a spatially-separated stable position relative to one or more of the other twisted pairs 120, which can be effective to reduce cross-talk. Moreover, it will be appreciated that in some embodiments, the bundle of yarn forming the separator 130 can conform to the outer surface of an individual conductor 122 in an unshielded twisted pair, for example, so as to minimize the relative movement and/or separation of the conductors 122 in a twisted pair, which in turn can be effective to reduce structural return loss and variations in impedance.

Moreover, in some aspects, it will be appreciated that the polymeric yarn can be effective to reduce material mass and/or costs relative to a pre-formed monolithic structure formed of the same material and in the same general cross-sectional shape.

An exemplary method for assembling cables in accordance with the present teaching will now be discussed with continued reference to FIG. 1. Prior to final jacketing, the twisted pairs 120 and one or more polymeric yarns (collectively "yarn bundle" 130) can be cabled together by pulling the twisted pairs 120 and polymeric yarns through a lay plate and die. In various aspects, the pressure of cabling can force the yarn or its filaments to fill any interstices between the twisted pairs. It will be appreciated that upon final jacketing, the yarn(s) can be effective to maintain the twisted pairs in a stable, spatially-separated position from one another.

Figure 3:
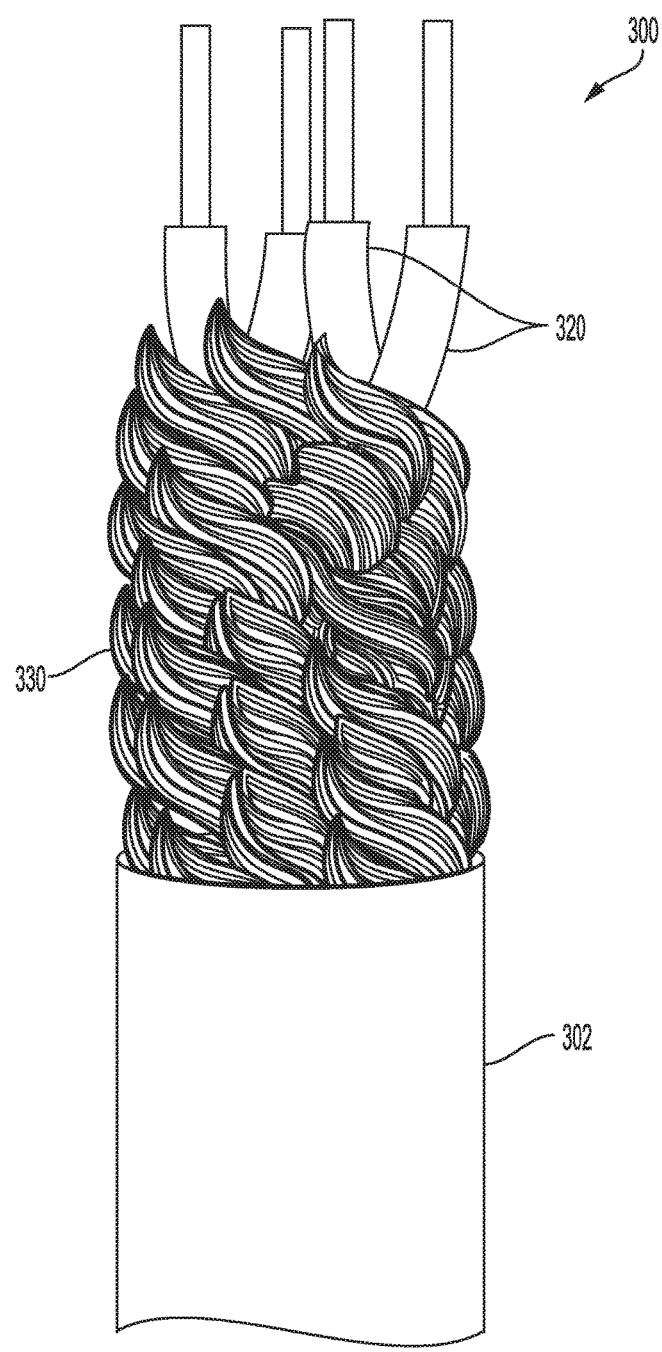
FIG. 3, in a schematic diagram, illustrates another exemplary cable utilizing a polymeric yarn in accordance with an aspect of various embodiments of the applicants' teachings.
Figure 4:
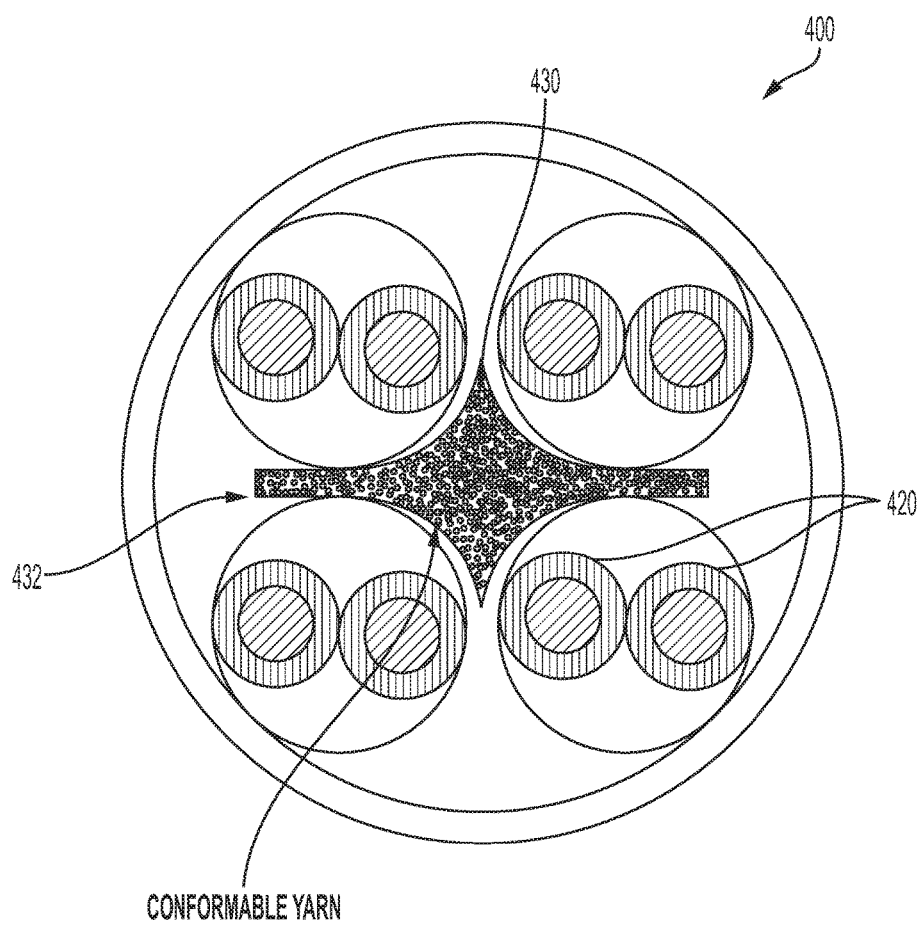
FIG. 4, in a schematic diagram, illustrates a cross-section of another exemplary cable utilizing a polymeric yarn to separate twisted pairs of conductors in accordance with an aspect of various embodiments of the applicants' teachings.

With reference now to FIG. 4, another exemplary cable 400 incorporating a polymeric yarn in accordance with various aspects of applicants' teachings is illustrated. The cable 400 is substantially similar to that of cable 100 of FIG. 1, but differs in that the yarn 430 includes radial extensions 432 that can be configured to extend longitudinally between one or more adjacent twisted pairs for at least a portion of their length. By way of example, the yarn can have a cross-sectional shape that biases the yarn 430 to the configuration as shown in FIG. 3 upon jacketing. Additionally or alternatively, the exemplary jacketing process discussed above can preferentially generate the radial extensions 432, based for example, on the shape of the lay plate and die. Though the exemplary cable 400 is depicted as having two radial extensions across the inner diameter of the cable 400, it will be appreciated that the yarns in accordance with the present teachings can be configured to obtain a variety of shapes within a jacketed cable. By way of example, the yarn 430 could include four radial extensions 432 such that each of the twisted pairs 420 is separated from the directly adjacent twisted pair by at least a portion of the yarn 430. In various aspects, the yarn 430 can be configured, for example, to maximize the spacing between the plurality of twisted pairs 420.

Figure 5:
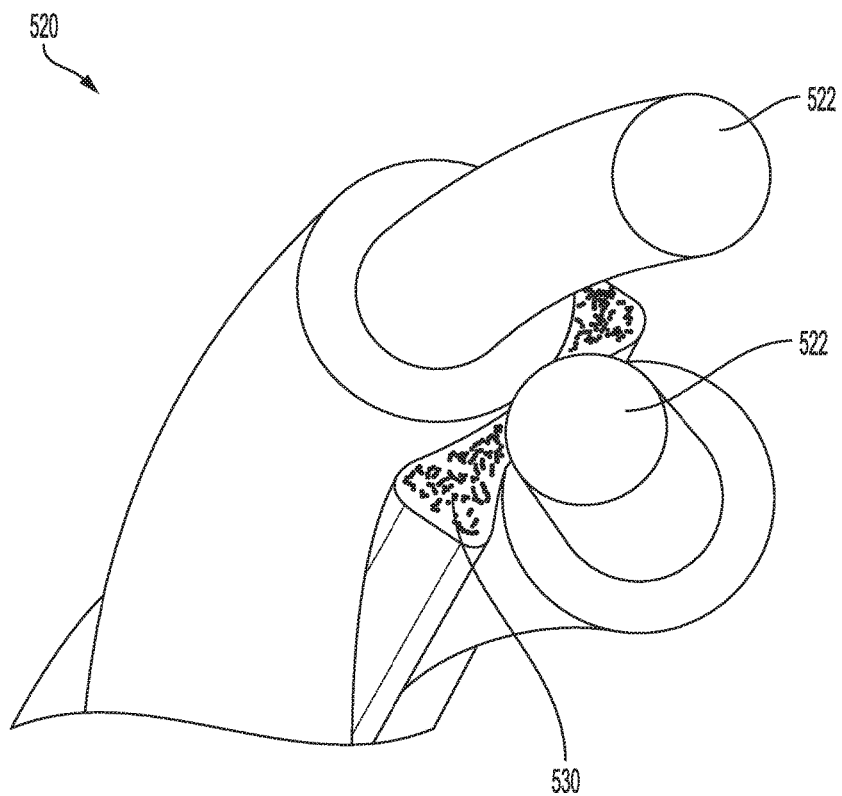
FIG. 5, in schematic diagram, illustrates in part another exemplary cable utilizing a polymeric yarn to separate the insulated conductors of a twisted pair in accordance with an aspect of various embodiments of the applicants' teachings.

It will further be appreciated that polymeric yarns in accordance with the teachings herein can also be configured to conform to and/or separate any number of twisted pairs of conductors. With reference now to FIG. 5, a portion of another exemplary cable utilizing a polymeric yarn configured to separate the conductors of a twisted pair is depicted. As shown in FIG. 5, the yarn 530 can extend longitudinally between the insulated conductors 522 of a single twisted pair 520. In accordance with various aspects of the present teachings, it will be appreciated that the polymeric yarn 530 can conform to the outer surface of the conductors 522 and can stabilize the orientation and/or spacing of the conductors 522 relative to one another. In such a manner, the conformable yarn can, in some embodiments, help maintain the conductors in a relatively constant, spatially-separated position, which can be effective to improve electrical characteristics of the twisted pair 532.

Figure 2A:
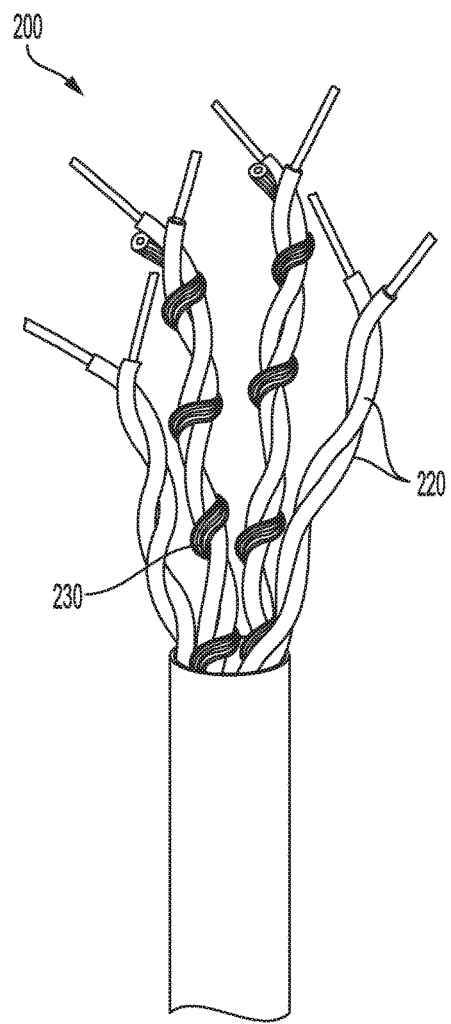
FIGS. 2A and 2B, in a schematic diagram, illustrate another exemplary cable utilizing a polymeric yarn in accordance with an aspect of various embodiments of the applicants' teachings.
Figure 2B:
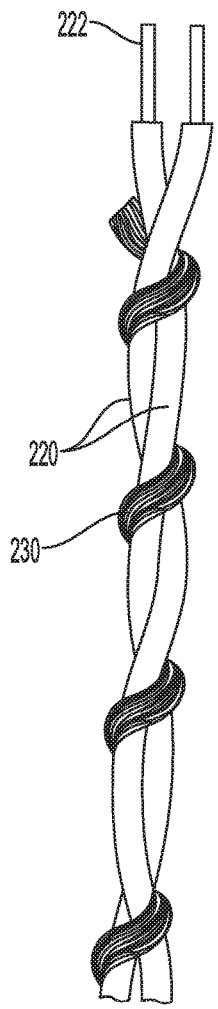

With reference now to FIGS. 2A and 2B, another exemplary embodiment of a cable 200 incorporating a polymeric yarn in accordance with various aspects of applicants' teachings is illustrated schematically. As shown in FIG. 2A, the cable 200 includes four twisted pairs 220, around two of which are wrapped an exemplary polymeric yarn 230 (or a bundle of polymeric yarns). It will be appreciated that when the twisted pairs 220 are disposed side-by-side, for example, within the cable 200, the polymeric yarn 230 can be effective to separate the wrapped twisted pair 220 from one or more adjacent twisted pairs 220 along at least a portion of its length. Moreover, it will be appreciated that by at least partially wrapping the yarn 230 around the twisted pair 220, for example, the relative movement and/or separation of the conductors 222 can be minimized, which in turn can be effective to reduce structural return loss and variations in impedance.

It should be further appreciated that though the polymeric yarn 230 depicted in FIGS. 2A and 2B is only partially wrapped around the twisted pair 220, polymeric yarn(s) 230 can, in some embodiments, be wrapped around one or more twisted pairs 220 so as to fully enclose the twisted pair 220. In such an embodiment, the polymeric yarn(s) 230 can act as a sheath to provide spatial separation from adjacent twisted pairs substantially along the entire length.

Similarly, with reference now to FIG. 3, another exemplary embodiment of a cable 300 incorporating a polymeric yarn is depicted in which the polymeric yarn 330 fully encloses a plurality of twisted pairs 320 (though only two twisted pairs are shown any number of pairs is possible). By way of example, one or more polymeric yarns 330 can be wrapped around the twisted pairs 320 so as to separate the bundle of twisted pairs 320 from the outer jacket 302, which can thereby improve electrical properties and/or reduce or eliminate cross-talk (e.g., alien cross-talk). It will be appreciated that the polymeric yarn 330 can have a variety of configurations and can be wrapped around the twisted pairs 320 in a variety of manners. By way of example, a plurality of polymeric yarns can be loosely wrapped around the twisted pairs 320. Alternatively or additionally, the polymeric yarns 330 can be braided (e.g., with a Wardwell Braider) around the plurality of twisted pairs 320.

The section headings used herein are for organizational purposes only and are not to be construed as limiting. While the applicants' teachings are described in conjunction with various embodiments, it is not intended that the applicants' teachings be limited to such embodiments. On the contrary, the applicants' teachings encompass various alternatives, modifications, and equivalents, as will be appreciated by those of skill in the art.

What is claimed is:

1. A telecommunications cable comprising:
   a plurality of conductors, the plurality of conductors comprising at least one twisted pair of conductors that comprises a sheath; and
   a fibrillated polymeric yarn comprising a plurality of filaments, the fibrillated polymeric yarn being configured to spatially separate at least two conductors from the plurality of conductors and to be conformable to the sheath of the at least one twisted pair of conductors;
   wherein the polymeric yarn is configured to exhibit a linear mass density in a range of about 1750 to about 22,000 denier and the plurality of filaments comprise any of polytetrafluoroethylene-perfluoromethylvinylether (MFA), fluorinated ethylene propylene (FEP), and perfluoroalkoxy (PFA).

2. The telecommunications cable of claim 1, wherein the polymeric yarn is configured to conform to an outer surface of at least one conductor from the plurality of conductors.

3. The telecommunications cable of claim 2, wherein one or more filaments from the plurality of filaments are orientated so as to allow conformance of the polymeric yarn to the outer surface of the at least one conductor.

4. The telecommunications cable of claim 1, wherein the fibrillated polymeric yarn is configured to be wrapped around at least one conductor from the plurality of conductors.

5. The telecommunications cable of claim 1, wherein the fibrillated polymeric yarn is configured to reduce at least one of crosstalk, structural return loss, and variation in impedance.

6. The telecommunications cable of claim 1, wherein the fibrillated polymeric yarn comprises one or more extensions configured to separate at least one conductor from the plurality of conductors from an adjacent conductor.

7. The telecommunications cable of claim 1, wherein the fibrillated polymeric yarn is configured to be wrapped around at least one conductor from the plurality of conductors to separate the at least one conductor from one or more adjacent conductors.

8. The telecommunications cable of claim 1, wherein the fibrillated polymeric yarn is configured to be wrapped around at least one conductor from the plurality of conductors to minimize relative movement of the at least one conductor relative to other conductors.

9. The telecommunications cable of claim 1, wherein the fibrillated polymeric yarn is configured to be partially wrapped around at least one conductor from the plurality of conductors.

10. The telecommunications cable of claim 1, wherein the fibrillated polymeric yarn is configured to be wrapped around at least one conductor from the plurality of conductors so as to fully enclose the at least one conductor.

11. The telecommunications cable of claim 1, wherein the plurality of filaments comprise a substantially uniform cross-sectional area.

12. The telecommunications cable of claim 1, wherein the plurality of filaments comprise different cross-sectional areas.

13. The telecommunications cable of claim 1, wherein the plurality of filaments exhibit an average linear mass density of about 8 to about 100 denier.

14. A telecommunications cable comprising:
    a plurality of conductors, the plurality of conductors comprising at least one twisted pair of conductors that comprises a sheath;
    a fibrillated polymeric yarn comprising a plurality of filaments, the fibrillated polymeric yarn being configured to spatially separate at least two conductors from the plurality of conductors and to be conformable to the sheath of the at least one twisted pair of conductors;
    wherein polymeric yarn is configured to exhibit a linear mass density in a range of about 1750 to about 22,000 denier and the plurality of filaments comprise a cross-sectional diameter in a range from about 20 microns to about 100 microns and the plurality of filaments further comprise any of polytetrafluoroethylene-perfluoromethylvinylether (MFA), fluorinated ethylene propylene (FEP) and perfluoroalkoxy (PFA).

15. The telecommunications cable of claim 14, wherein the plurality of filaments comprise a substantially uniform cross-sectional area.

16. The telecommunications cable of claim 14, wherein the plurality of filaments comprise different cross-sectional areas.

17. The telecommunications cable of claim 14, wherein the plurality of filaments exhibit an average linear mass density of about 8 to about 100 denier.

18. The telecommunications cable of claim 14, wherein the polymeric yarn is configured to conform to an outer surface of at least one conductor from the plurality of conductors.

19. The telecommunications cable of claim 18, wherein one or more filaments from the plurality of filaments are orientated so as to allow conformance of the polymeric yarn to the outer surface of the at least one conductor.

20. The telecommunications cable of claim 14, wherein the fibrillated polymeric yarn is configured to be wrapped around at least one conductor from the plurality of conductors.

* * * * *